United States Patent

Shannon

[19]

[11] Patent Number: 6,138,490
[45] Date of Patent: Oct. 31, 2000

[54] PROCESS FOR RENDERING A METAL SHEET SUITABLE FOR LIGHTING APPLICATIONS AND SHEET PRODUCED THEREBY

[75] Inventor: James O. Shannon, Ravenswood, W. Va.

[73] Assignee: Pechiney Rolled Products LLC, Ravenswood, W. Va.

[21] Appl. No.: 09/237,807

[22] Filed: Jan. 27, 1999

Related U.S. Application Data

[60] Provisional application No. 60/093,146, Jul. 17, 1998, abandoned.

[51] Int. Cl.$^7$ .............................. B21B 1/00; B21B 39/20
[52] U.S. Cl. .......................................... 72/365.2; 72/252.5
[58] Field of Search ................................. 72/252.5, 234, 72/365.2, 366.2, 199; 428/687, 156, 141, 135, 923, 600; 29/17.1, 17.2, 33 R, 895, 895.3

[56] References Cited

U.S. PATENT DOCUMENTS

| | | | |
|---|---|---|---|
| 4,111,032 | 9/1978 | Rault | 72/366 |
| 4,996,113 | 2/1991 | Hector et al. | 72/199 |
| 5,025,547 | 6/1991 | Sheu et al. | 29/527 |
| 5,250,364 | 10/1993 | Hector, Jr. et al. | 428/687 |
| 5,799,527 | 9/1998 | Kenmochi et al. | 72/199 |
| 5,857,373 | 1/1999 | De Mare et al. | 72/366.2 |

FOREIGN PATENT DOCUMENTS

| | | |
|---|---|---|
| 64-5628 | 1/1989 | Japan . |
| 2-107751 | 4/1990 | Japan . |

OTHER PUBLICATIONS

"Electron Beam Texturing of Rolls", Dolves et al., Iron and Steel Engineer, Aug., 1991, pp. 33–58.

"Update of Developments in Lasertex Technology", Defourny et al., Iron and Steel Engineer, Aug., 1991, pp. 39–45.

"Development of High Image Clarity Steel Sheet by Laser Texturing", Nishimuira et al., Iron and Steel Engineer, Aug., 1991, pp. 46–51.

"Application of Laser–Textured Steel Sheets for Autobody Panels", Ujihara et al., Iron and Steel Engineer, Aug., 1991, pp. 52–56.

"Advances in Electro–Discharge Texturing (EDT) for Cold Mill Work Rolls", El–Menshawy et al., Iron and Steel Engineer, Aug., 1991, pp. 57–59.

*Primary Examiner*—Rodney A. Butler
*Attorney, Agent, or Firm*—Bowles Rice McDavid McDavid Graff & Love; Susan E. Shaw McBee

[57] ABSTRACT

Non-directional and diffuse reflecting photometric properties may be imbued to a metal sheet stock, particularly aluminum alloy sheet stock, by directly creating a textured surface on one or more surfaces of the sheet stock through mechanical texturing with at least one textured work roll in a cold roll reducing mill. A textured metal sheet surface thus produced is characterized by having over its entire surface randomly formed imbricated depressions transversely arranged, such that each depression has a substantially transverse width dimension relative to a longitudinal axis of the sheet and a longitudinal dimension greater than its width. The depressions formed are substantially equiaxial. Surface properties of both the textured work roll and the textured metal sheet may be controlled. The metal sheet stock are subjected to finishing steps such as chemical brightening and anodizing, or organic coating to provide lighting sheets with high total reflectance.

20 Claims, 4 Drawing Sheets

70 Ra Roll

40 Ra Roll

FIG. 3A
1-Side EDT
70 Ra
FIG. 3B
1-Side EDT
40 Ra
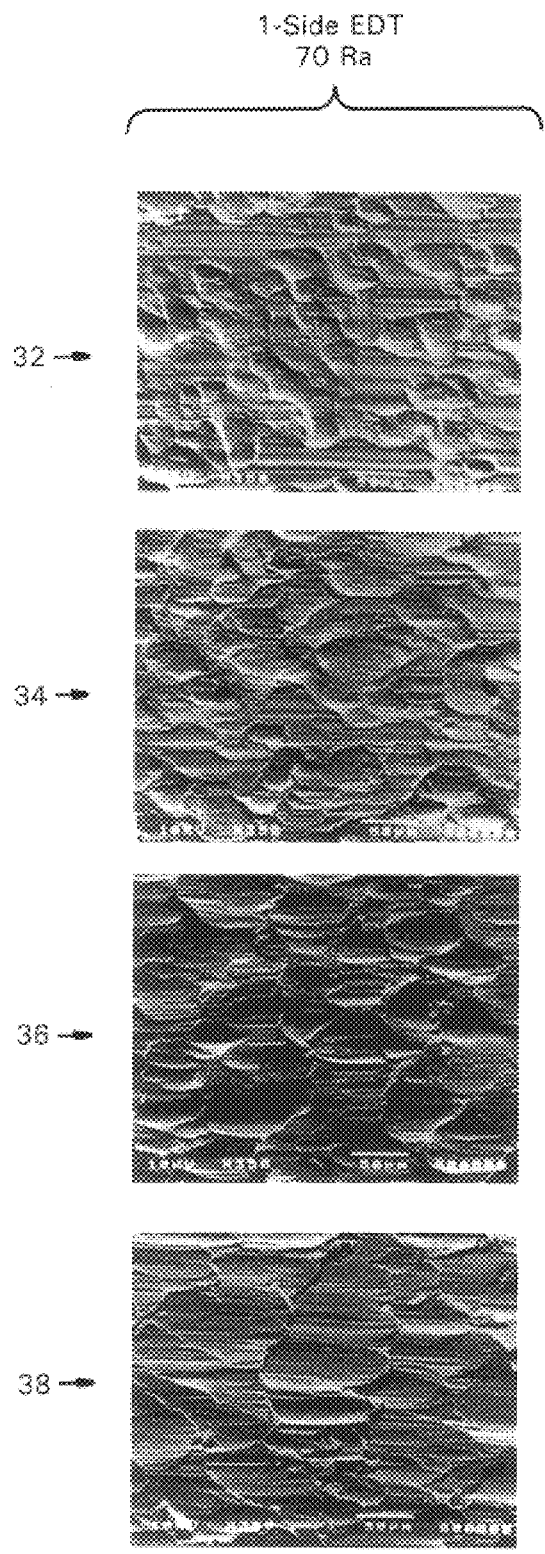
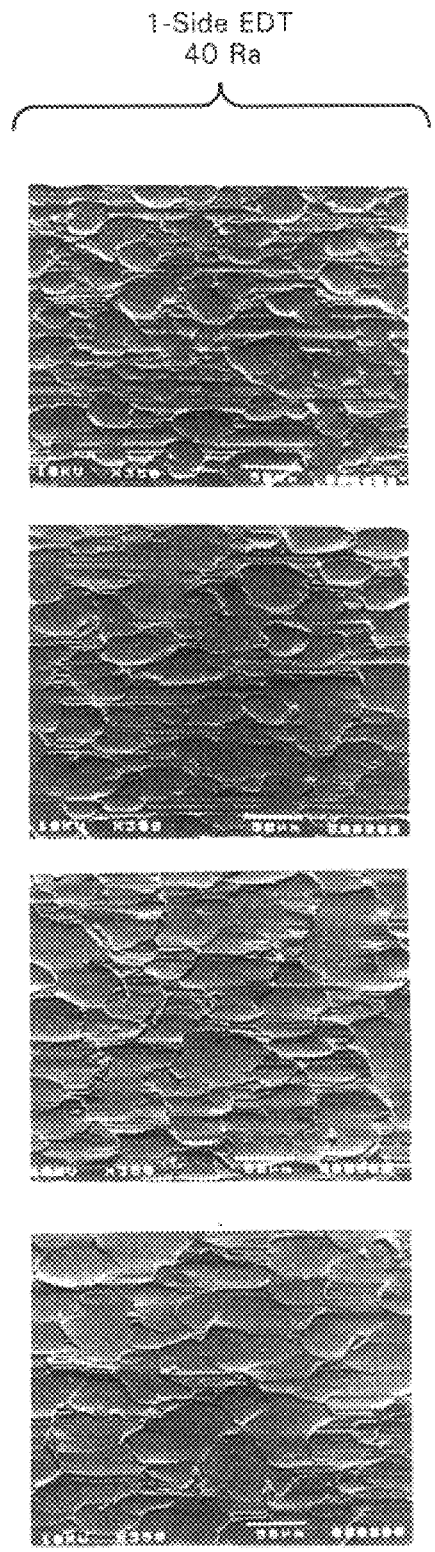

50 Entire Surface

51

52 Entire Surface

53

PROCESS FOR RENDERING A METAL SHEET SUITABLE FOR LIGHTING APPLICATIONS AND SHEET PRODUCED THEREBY

CROSS REFERENCE TO RELATED APPLICATIONS

This application claims the benefit of U.S. Provisional application No. 60/093,146, filed Jul. 17, 1998, now abandoned.

BACKGROUND OF THE INVENTION

1. Field of the Invention

The present invention relates to metal sheet materials suitable for lighting reflector applications. More particularly, the present invention provides aluminum sheet materials with a textured surface and a process for making the sheet materials.

2. Description of the Prior Art

Aluminum sheets have been used in lighting applications, such as in reflector assemblies. For these applications, aluminum sheets must have various photometric properties to meet requirements of lighting fixture manufacturers. Among the most highly sought photometric properties are high total reflection (the amount of light reflected by the sheet, as a percentage of incident light), and diffuse or non-directional reflection of light. These properties have been achieved in the prior art by a combination of careful alloy selection for the sheet stock material and one of two cold rolling practices. In one practice, the sheet stock is cold rolled to a standard mill finish, followed by either chemical/electrochemical finishing or organic coating. In the other practice, at least one surface of aluminum alloy sheet is cold rolled with a specular or bright cold rolled surface using a work roll that has been ground to a smooth finish. This resultant sheet has high specular or mirror like reflectance and high total reflectance. Once bright rolled, diffuse and nonspecular light reflectance is imparted to the sheet through chemical and electrochemical (anodizing) surface treatments.

Available methods for producing a desired diffuse, non-directional reflecting surface with sufficient total reflectance have a number of drawbacks. Firstly, the mill finish cold rolled practice produces a final product finish that has substantial directional light reflecting properties due to an array of closely spaced microridges and valleys imprinted into the sheet surface in the direction of rolling. Secondly, bright cold rolled specular surfaces are costly to produce and are easily rendered unfit for use through superficial marking of the specular surface during rolling, handling, and/or final finishing. Thirdly, the generation of a diffuse, non-directional photometric surface through chemical/electrochemical finishing of the bright surface is not easily reproducible due to microstructural features in the sheet that can adversely affect consistency of the finished product. For instance, photometric properties including specular reflectance, total reflectance, DI (image clarity), color and directionality, of the finished sheet are affected by impurities in the selected aluminum alloy, the as-rolled finish, thermo-mechanical processing, and chemical/electrochemical finishing operations. Clear organic coatings suffer from lack of durability, as the organic coating is subject to yellowing and cracking as it ages.

Though heretofore not used in lighting applications, textured sheet stock has been produced for use in exterior auto body parts. Textured sheets are produced by imparting to one or both flat opposed surfaces of sheet stock (or strip stock) a pattern of surface features. This has been practiced to reduce and control frictional forces and/or to provide adequate lubrication between the sheet surface and tooling used during forming operations such as stamping. Textured sheet stock has also been used to prepare a surface for painting. Patterns of surface features have been imparted in sheet stock by creating a selected textured roll surface on one or more work rolls of a cold rolling mill employed to reduce the sheet stock to final thickness. Various techniques including shot blast, energy beam (such as laser or electron beam), or electro-discharge (EDT) have been used to create the selected textured roll surface.

U.S. Pat. Nos. 4,111, 032 and 5,025, 547; Japanese patent publications nos. 64-5628, dated Jan. 10, 1989 and 2-107751, dated Apr. 19, 1990; and publications "Electron Beam Texturing of Rolls", "Update of Developments in Lasertex Technology", "Development of High Image Clarity Steel Sheet by Laser Texturing", "Application of Laser-Texturing Steel Sheets for Auto Body Panels", and "Advance in Electro-Discharge Texturing (EDT) for Cold Mill Work Rolls" appearing in "Iron and Steel Engineer", August 1991, pages 33 through 59 inclusive, describe texturing of steel sheet stock. Further, U.S. Pat. Nos. 4,111,032 and 5,025,547 describe texturing in which the resultant textured sheet has raised portions or beads.

None of the above inventions and patents, taken either singly or in combination, is seen to describe the instant invention as claimed.

SUMMARY OF THE INVENTION

It has been unexpectedly found that both non-directional and diffuse reflecting photometric properties may be imbued to a metal sheet stock by directly creating a textured surface on one or more surfaces of the sheet stock through mechanical texturing. This is accomplished by rolling the sheet stock with textured work roll or work rolls. The prior art practice of creating a specular or bright rolled surface, or a mill finish surface requiring chemical etching for subsequent electro-chemical (anodizing) finishing can be eliminated. More unexpectedly, total reflectance of textured metal sheets according to the present invention is comparable to that of prior art bright rolled sheets, even when specular reflection is significantly less. Many of the problems associated with creating and processing bright rolled specular sheet stock are thereby avoided, as well as associated costs. Also, the directionality effects associated with the mill finish approach are eliminated.

By the method of the present invention, a non-directional, diffuse reflecting sheet surface is created in which the sheet surface is characterized by having over its entire surface randomly formed microscopic depressions. Preferably, the depressions take the imbricated form of closely adjacent or overlapping shingles. The depressions may be oriented, such that each depression has a substantially transverse width dimension relative to a longitudinal axis of the sheet and a longitudinal dimension greater than its width. Preferably, the depressions formed are substantially equiaxial. The sheet surface may be subjected to finishing steps such as chemical brightening and anodizing or given a clear organic coating after cold rolling with the textured roll or rolls.

Accordingly, it is a primary object of the present invention to provide a mechanically textured sheet and a method of making the sheet for use in lighting applications.

It is another object of this invention to produce a mechanically textured sheet that will streamline and reduce process costs, while more consistently producing desired diffuse, non-directional, and high total reflection photometric properties.

Another object of the present invention is to provide in the aforesaid textured sheet a pattern of depressions.

A still further object of the present invention is to provide a textured sheet and process for producing it, wherein texturing is imparted to the sheet by one or more textured work rolls of a cold rolling mill.

A still further object of the present invention where work rolls are employed in conjunction with the use of a coolant for the rolls.

These and other objects of the present invention will become readily apparent upon further review of the following specification and drawings.

BRIEF DESCRIPTION OF THE DRAWINGS

FIGS. 3A and 3B are surface topographies (350x) of rolled sheets, produced with two different roll-texturing patterns, over a range of different percent cold rolling mill reductions.

Similar reference characters denote corresponding features consistently throughout the attached drawings.

DETAILED DESCRIPTION OF THE PREFERRED EMBODIMENTS

Figure 1:
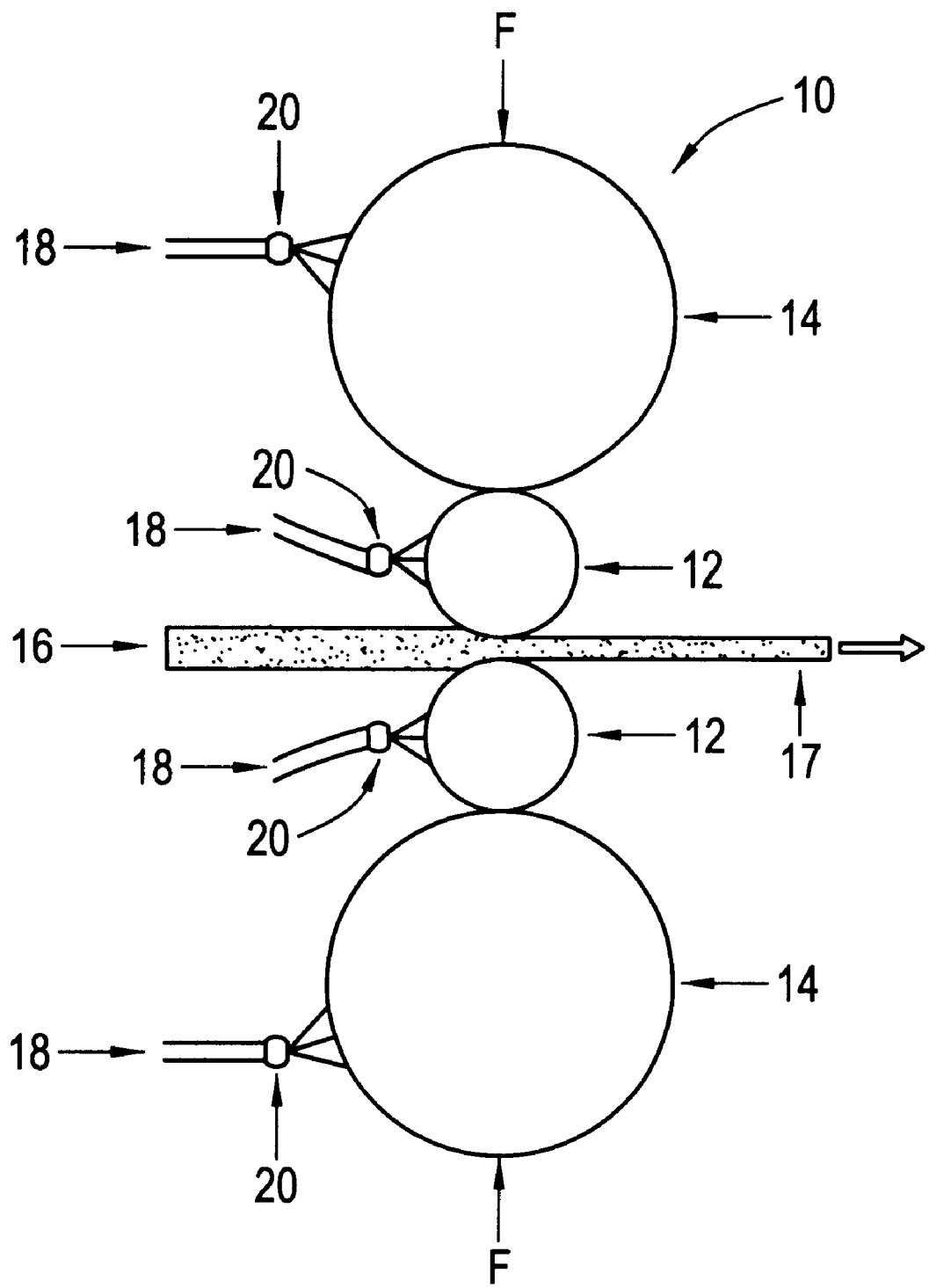
FIG. 1 is a schematic elevational view of a 4-high cold rolling mill stand for use in a preferred embodiment of the present process.

With reference to FIG. 1, there is illustrated schematically a well known 4-high cold mill stand 10 having a pair of forged steel alloy work rolls 12, each of which is backed up by a back up roll 14, the work rolls forming a roll pass for receiving, in the direction indicated by the arrow 17, a sheet (strip) 16 to be reduced and textured by a rolling force legend F. The stand 10, may be a single stand in which the sheet 16 is passed through for the purpose of taking the final cold reduction to reduce the sheet to its final gauge, or may be the final stand of a tandem cold mill, for example, a five stand tandem cold mill.

One or both of the work rolls 12 have a textured rolling surface depending on whether one or both of the rolled flat surfaces of the sheet are to have a textured surface. Also schematically shown with the stand 10 is roll coolant equipment, the references 18 and 20 indicating the piping and headers, respectively, of the coolant equipment for applying a coolant medium. In cold rolling aluminum, two different types of coolant medium for the rolls may be employed, namely a water base and a mineral oil base. While both are applicable to the present invention, employing a mineral oil base coolant, i.e., a kerosene base is preferred. Advantages of using mineral oil include freedom from water stain, and increased shape control for the light texturing passes.

The technique and/or process for texturing one or both of the work rolls 12 can be one of several presently available, for example, energy beam (laser or electron beam), electro-discharge, or shot blast. Preferably, electro-discharge texturing (EDT) is used. The textured rolls may then be chrome plated to improve wear characteristics. According to the present invention, it is important that in texturing the roll, a random pattern of depressions be formed over substantially the entire working roll surface, preferably with a substantial degree of transversely or randomly arranged raised bumps.

Figure 2A:
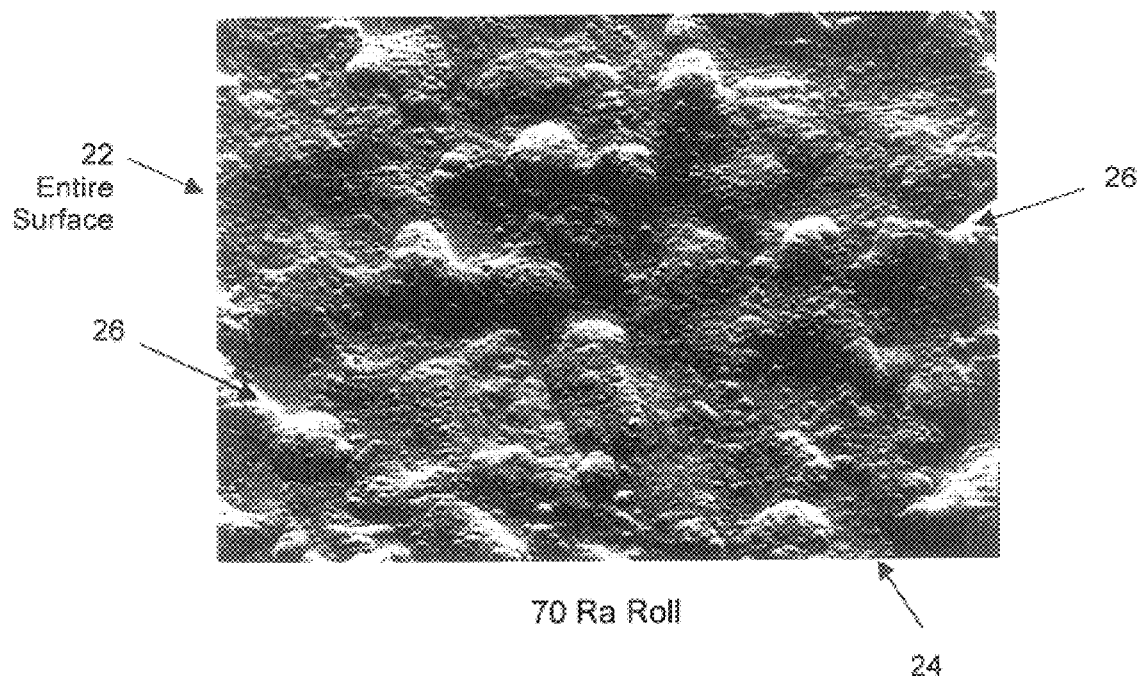
FIGS. 2A and 2B are scanning electron microscope (SEM) micrographs (350x) illustrating textured roll surface topographies.
Figure 2B:
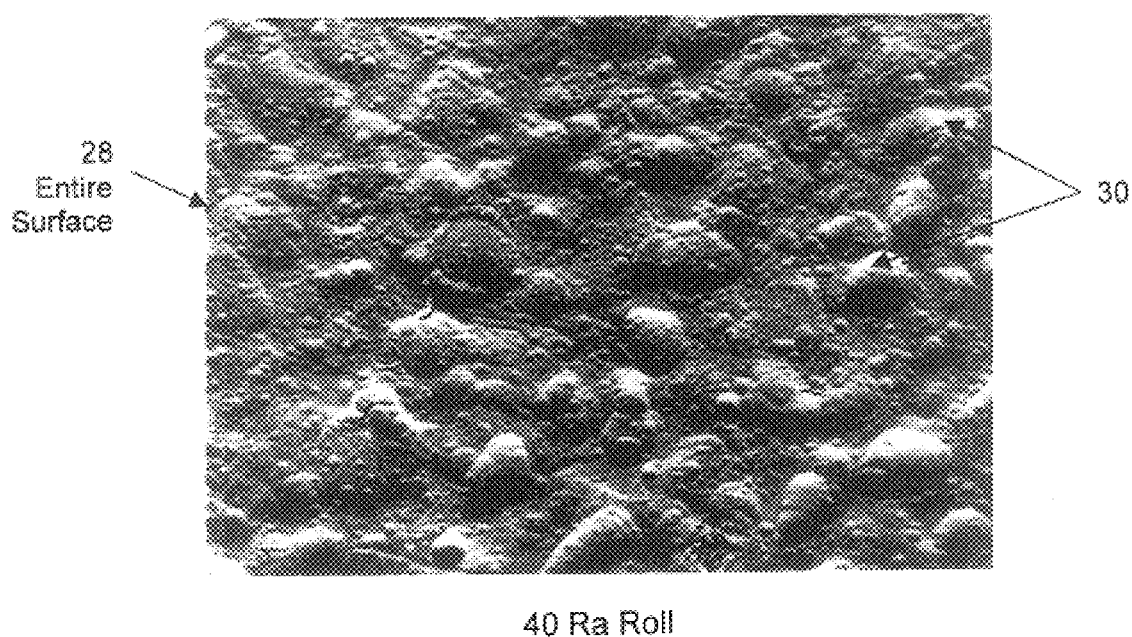

It has been found that by controlling the texture pattern on the rolling surface of the textured work roll, desired photometric properties may be more easily and reproducibly imbued to the rolled sheet. The importance of the texture pattern can be seen in comparing steel roll surfaces of work rolls 12 shown in FIGS. 2A and 2B. FIG. 2A illustrates a portion of an alloy forged steel roll, the outer surface 22 of which has been ground, subjected to EDT, and chrome plated. The surface 22 of FIG. 2A has a roughness value of 70 RA, RA representing the arithmetic average of roughness as determined by the number and amplitude of depressions or peaks in a given area of a surface in microinches. In examining the surface 22, it is to be observed that there is present a substantial number of relatively large areas that have not been significantly textured, one of which is identified at 24, where relatively "flat" surfaces of the roll still exist due to the extent of bead separation. By comparison, the ground, EDT textured and chrome plated roll surface 28 as shown in FIG. 2B has a roughness rating of 40 RA, at which roughness rating, practically all areas having been substantially altered as ground, as preferred in the present invention. The beads 30 are smaller and closer together when compared to beads 26. In the preferred form of the invention it is desired that the RA rating of the textured work roll surface be kept substantially in the range of 25 to 55 RA lo microinches, and preferably between 25 and 45 RA microinches.

The point count or pitch (p), a measure of peaks per inch (ppi) of linear distance transverse to the rolling direction as measured by a stylus profilometer, is also a valuable measurement of the textured work roll surface. The 40 RA roll surface shown in FIG. 2B was found to have a point count value of approximately 500 peaks per linear inch. In the preferred form of the invention it is desired that the point count be maintained substantially in the range of 300 to 550 peaks per inch.

The imprints made by bead textured roll surfaces are depressions on sheet 16. When the pattern of beads on the roll surface are maintained in the prescribed RA and point count ranges, a sheet 16 produced will have particularly desirable photometric qualities suitable for diffuse non-directional lighting applications. Preferably, the textured sheet has a textured pattern, wherein the depressions are characterized by having a RA range of 10 to 55 microinches and a point count of 300 to 550 ppi (peaks per inch). More preferably, the RA range is from about 15 to about 36 microinches.

Turning now to the effect 40 RA and 70 RA roll textures will have on sheet 16, reference is made to FIGS. 3A and 3B. The sheets illustrated may be produced from one of several aluminum alloys presently used for lighting sheet. For example, AA 3104, and AA 5005, (alloys registered with the aluminum association) are highly suitable for the present invention. In FIG. 3A there is shown a series of four reproduced surface topographies of four sheets, which sheets have imparted to one of their surfaces a texturing by a single textured 70 RA work roll for four selected cold rolling reductions, namely at 3%, 5%, 10% and 15% reading from top to bottom in the figure. The four 70 RA rolled surfaces are identified as 32, 34, 36, and 38. In FIG. 3B similar portrayals are shown for four sheets produced by 40

RA textured work rolls; the surfaces of the sheets being identified as 40, 42, 44 and 46. The conditions of the surfaces represented in FIGS. 3A and 3B reveal the importance between the relationship of the RA of the textured work roll and the % reduction during cold textured rolling. Rolling force will increase as the % reduction is increased. Using a textured work roll within the preferred ranges, as represented by the 40 RA EDT roll, the roughness of a rolled sheet did not significantly vary as a function of the % reduction, thereby allowing consistent sheet texturing over a range of % reductions. By comparison, using the 70 RA EDT roll, the roughness of a rolled sheet increases as % reduction increases.

In viewing the surface topographies of FIGS. 3A and 3B, it can be seen that at 15% reduction, depressions formed by the beads or impressions of the textured roll surface are clearly evident. Higher levels of reduction may produce significant flattening of depressions, which in turn reduces scattering of reflected light. At 10% reduction, surfaces show depressions in which flattening is evident to a lesser extent, and are therefor preferable. At the 3% and 5% cold reduction rolling conditions the textured depressions of the textured surfaces retained much of the replication of the original textured roll surface in negative relief, with almost no flattening evident, and are therefore most preferable. Some replication loss in the sheet may be tolerated, as high as 40%, depending on the physical properties of the metals of the sheet and roil, as well as process conditions including rolling pressure, rolling speed, sheet tension and lubrication. Accordingly, for a sheet 16 with photometric properties suitable for lighting applications, the reduction may be from about 2% to about 15%. Preferred reduction is from greater than 2% to about 10%.

At preferred reduction levels, a number of well-known production problems can be lessened in degree or frequency, or substantially eliminated. For instance, negative coil set problems can be substantially eliminated for one side EDT applications as well as reduced roll wear for larger rolling campaigns and roll life. Dirt generation, i.e. rolling debris is substantially decreased. Therefore, desired photometric properties may be more practically realized, with less production loss due to such problems. The preferred rolling reductions also minimize objectionable "feel" surface roughness of the finished lighting sheet. For 0.020 inch gauge AA 3104 aluminum one side EDT rolled sheets, the most preferred % reduction is about 5% when using textured work rolls having a 40 RA microinches and 500 point counts per inch textured pattern. For two sided EDT sheets, a reduction of 3% at the same sheet and roll conditions is most preferred.

As evident in comparing the surfaces 32 and 34 with surfaces 40 and 42, respectively, the % reduction is important in obtaining an improved texturing condition in the sheet. In surfaces 40 and 42 a texturing has been accomplished without significantly disturbing the contour, shape and random transverse pattern and sizes of the textured depressions over the entire surfaces. In contrast the surfaces 32 and 34 still possess the drawbacks noted above as to the 70 RA condition of the roll surface of FIG. 3A, in which significant areas of flatness are seen. It is also important to point out that surfaces 40 and 42 are characterized by having over the entire surface randomly formed depressions, the depressions taking an imbricated form having the appearance of either closely adjacent or overlapping shingles or fish scales, each depression having a substantially transverse width dimension relative to the longitudinal axis of the sheet and a length dimension slightly greater than its width, the length to width ratio being approximately 1:1.5 increasing with % reduction, i.e., a substantially equiaxial pattern.

Figure 4A:
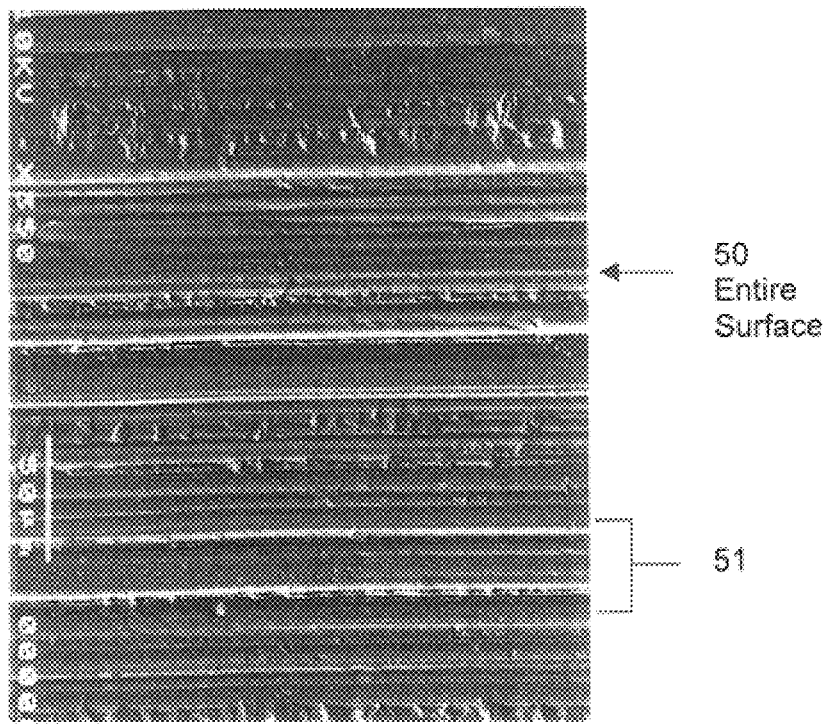
FIGS. 4A and 4B are SEM micrographs (350x) of two rolled surfaces, produced with untextured (conventionally ground) and textured work rolls, respectively.
Figure 4B:
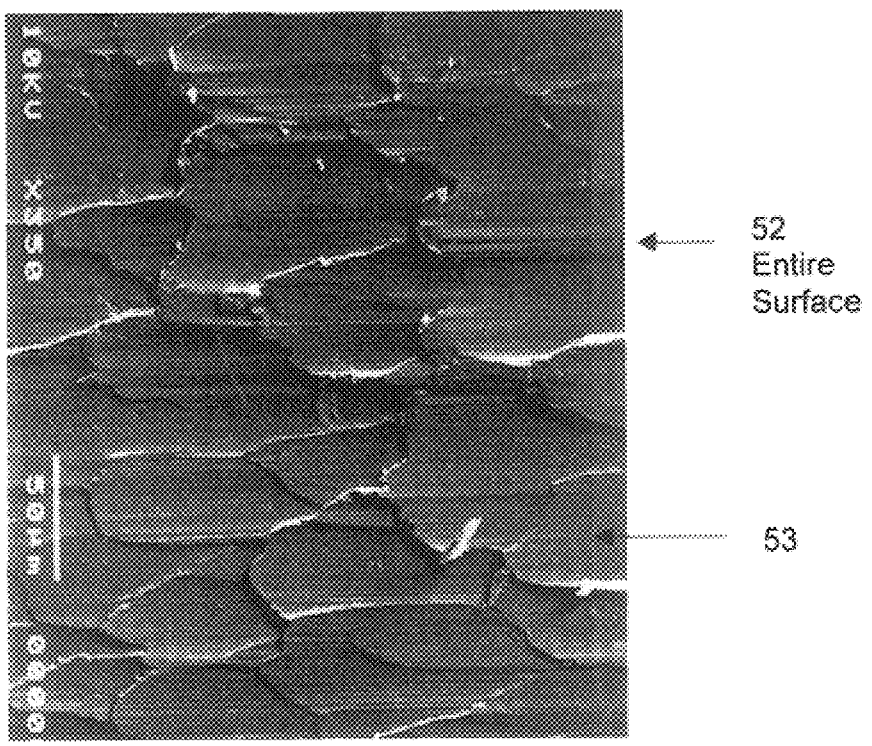

To more fully appreciate the photometric properties imbued by mechanically texturing a metal sheet, comparable alloys were reduced with and without textured work rolls. FIGS. 4A and 4B show two representative sheet surfaces of the same Is gauge and aluminum alloy. The sheet surface 50 of FIG. 4A represents a rolled sheet using untextured, mill finish, work rolls, such as is conventionally used, where a common mineral oil base coolant has been used. The rolled sheet surface produced is generally characterized by long parallel randomly spaced apart longitudinal, very light ridges and valleys 51 in the direction of rolling. Accordingly, sheet surface 50 has very directional light reflecting properties. By comparison, sheet surface 52 in FIG. 4B was produced with EDT textured rolls, again rolled with a mineral oil base coolant. The textured depressions 53 are shown to be deep and extensive, transversely arranged and equiaxial. This pattern of random depressions provides effective scattering of reflected light which is substantially non-directional.

EXAMPLES

Example A

EDT Textured AA 3104

An aluminum sheet in coil form was fed to a cold reduction mill between forged steel alloy work rolls having diameters of 20 inches and hardness values of 93 to 102 Shore C. The aluminum coil was of an AA 3104 alloy. The sheet was given a 5% reduction to decrease its thickness to the final desired gauge of 0.020 inch having a stress level at between 44 ksi to 46 ksi. The final reduction was performed with an EDT textured roll. The work rolls during the reduction were subject to a mineral oil base coolant. The sheet issuing from the mill 10 was recoiled, given a partial anneal, and slit into desired width. Chemical surface finishing by chemical brightening and anodizing was then applied to the sheet to produce a lighting sheet, sample A. Photometric characteristics of sample A are reported in Table 1.

Example B

EDT Textured AA 5205 With 8% Final Reduction

An aluminum AA 5205 alloy sheet in coil form was fed into a cold reduction mill between forged steel alloy rolls having diameters of 20 inches and hardness values of 93 to 102 Shore C. The sheet was given an 8% reduction to decrease its thickness to the final desired gauge of 0.018 inch having stress level at between 22 ksi to 26 ksi. The final reduction was made with an EDT textured roll subject to a mineral oil base coolant. The sheet issuing from the mill 10 was recoiled, given a partial anneal, and slit into desired widths. Chemical surface finishing by chemical brightening and anodizing was then applied to the sheet to produce a lighting sheet, sample B. Photometric characteristics of sample B are reported in Table 1.

Example C

EDT Textured AA 5205 With 38% Final Reduction

The conditions for this example were the same as example B except the sheet was given a 38% reduction to decrease its thickness to the final desired gauge of 0.012 inch having a stress level between 27 ksi to 32 ksi. The photometric characteristics of this finished sheet are reported in Table 1, sample C. In contrast to sample B, sample C shows the negative effects of the large 38% final pass reduction on the desired RS, DI, and D photometric properties, however these properties are still superior to those in the standard mill finish sample D.

For comparison purposes, an available AA 5205 standard mill finish cold rolled sheet was also finished by chemically brightening and anodizing to produce sample D. For further comparison purposes, an available AA 5205 one side bright (OSB) sheet was also finished by chemically brightening and anodizing to produce sample E.

TABLE 1

| PHOTOMETRIC | SAMPLE | | | | |
|---|---|---|---|---|---|
| CHARACTERISTIC | A | B | C | D | E |
| Specular Reflectance (RS) | 1.1 | 2.4 | 4.0 | 6.3 | 48.1 |
| Distinctness of Image (DI) | 1.7 | 2.8 | 10.8 | 27.8 | 83.9 |
| Total Reflectance (TR) | 80.7 | 85.1 | 84.5 | 84.6 | 85.2 |
| Directional (2° cross grain/2° with Grain) (D) | 1.4 | 2.0 | 2.7 | 10.9 | 1.8 |

Specular reflectance (RS) is a measure of the reflected image quality with a 0 meaning no image clarity and a 100 indicating a perfect clear mirror image. Here 0–5 represents samples in the preferred range for a nondirectional lighting reflector.

Distinctness of Image (DI) is a value analogous to the Specular Reflectance but measured using a different test.

Total Reflectance (TR) is a measure of the amount of light which is reflected back from the total surface, assuming an efficient parabolic shape. The levels of TR depend on the amount of impurities in the metal and fall into different quality levels. While a higher purity aluminum such as a 5205 alloy might result in a TR rating of 0 85, levels for the alloy AA 3104 in the 79–80 range are considered to be acceptable based on alloy purity.

The Directional measurement (D) is a ratio of light reflected across the grain divided by the light reflected with the grain, where 1 has absolute non-directionality. For this measurement the reflected light is measured at a reflectance angle between 28 and 32 degrees; known as 2 degree reflectance.

As can be seen from the above, the measured photometric properties of the five samples vary considerably. While the total reflectance varies only moderately as a function of the base metal purity, the specular reflectance (RS), distinctness of image (DI), and directionality (D) vary greatly as a function of the topography of the as-rolled sheet. Only the EDT textured sheet provides the optimum combination of high total reflectance, low specular reflectance and nondirectionality. Also, to the trained or untrained eye lighting sheets made according to the present invention resulted in a more "pleasing," almost silky appearance as compared to conventionally produced materials, which is important to the application of the current invention and lacking in materials produced by other methods.

It is of course to be understood that the present invention is not limited to the sole embodiment described above, but encompasses any and all embodiments within the scope of the following claims.

I claim:

1. A process for rendering a metal sheet suitable for use as a light reflector, said method comprising:
   mechanically texturing at least one surface of said metal sheet with a pair of reducing rolls for reducing the thickness of said metal sheet to a final gauge to imbue said at least one surface of said sheet with non-directional, diffuse reflecting photometric properties forming random depressions on said at least one surface through said texturing, and wherein said process further comprises subjecting said metal sheet to a cold rolling force sufficient to reduce said metal sheet to said final gauge by passing said metal sheet between said pair of reducing rolls, and controlling the RA value of said depressions between 10 and 55 microinches and controlling the point count value of said depressions between 300 and 550 peaks per inch
   surface finishing said sheet, to form said light reflector.

2. A process according to claim 1, wherein said surface finishing comprises one or more of chemical brightening, anodizing and/or organic coating.

3. A lighting sheet prepared according to the process of claim 1.

4. A process for rendering a metal sheet suitable for use as a light reflector, said method comprising.
   mechanically texturing at least one surface of said metal sheet with at least one rotating textured work roll to imbue said at least one surface of said sheet with non-directional, diffuse reflecting photometric properties forming random depressions on said at least one surface through said texturing
   surfacing finishing said metal sheet, if necessary, to produce said light reflector.

5. A process according to claim 4, wherein during said texturing, said textured work roll is lubricated with a lubricant selected from a mineral oil lubricant and a water base lubricant.

6. A process according to claim 4, wherein said depressions take an imbricated form.

7. A process according to claim 4, wherein said textured work roll has a textured rolling surface imparted by an electro-discharge process.

8. The process according to claim 4, wherein said textured work roll is a cold reducing roll of a pair of reducing rolls for reducing the thickness of said metal sheet to a final gauge, said process further comprising subjecting said metal sheet to a cold rolling force sufficient to reduce said metal sheet to said final gauge by passing said metal sheet between said pair of reducing rolls, and controlling the RA value and point count value of said depressions formed on said at least one surface of said metal sheet.

9. A process according to claim 4, further including organically coating said sheet.

10. A process according to claim 4, further including chemically brightening and anodizing said sheet.

11. A process according to claim 4, wherein said surface finishing comprises one or more of chemical brightening, anodizing and/or organic coating.

12. A lighting sheet prepared according to the process of claim 4.

13. A process according to claim 4, wherein said light reflector has a specular reflectance of not greater than about 4.0.

14. A process according to claim 4, wherein said light reflector has a distinctness of image of not greater than about 10.8.

15. The process according to claim 8 wherein said RA value is controlled between about 10 to about 55 microinches, and said point count value is controlled between 300 to 550 peaks per inch.

16. A process according to claim 8, wherein each roll of the pair of reducing rolls is a textured work roll.

17. The process according to claim 8, wherein said metal sheet is an aluminum alloy, and said final gauge is in the range of approximately 0.010 inch to 0.035 inches, obtained by subjecting said metal sheet to sufficient cold rolling force to produce a reduction of from about 2% to about 40% of the sheet entering said pair of reducing rolls.

18. A process according to claim 5 wherein said random depressions include depressions transversely aligned to a longitudinal axis of the reducing rolls.

19. The process according to claim 17 wherein said reduction is from 2% to about 40% of the sheet thickness entering said pair of reducing rolls.

20. A process according to claim 18, wherein said depressions have transversely extending portion relative to the longitudinal axis of the reducing rolls, at least a majority of which have generally equiaxial shapes.

\* \* \* \* \*